(12) United States Patent
Saliba et al.

(10) Patent No.: US 7,110,210 B2
(45) Date of Patent: Sep. 19, 2006

(54) MULTI-CHANNEL MAGNETIC TAPE SYSTEM HAVING OPTICAL TRACKING SERVO

(75) Inventors: George A. Saliba, Northboro, MA (US); Satya A. Mallick, Milford, MA (US); Chan Kim, Holliston, MA (US); Carol Turgeon, Franklin, MA (US); Leo Cappabianca, Worcester, MA (US); Lewis Cronis, Mendon, MA (US)

(73) Assignee: Quantum Corporation, San Jose, CA (US)

( * ) Notice: Subject to any disclaimer, the term of this patent is extended or adjusted under 35 U.S.C. 154(b) by 324 days.

(21) Appl. No.: 10/198,188

(22) Filed: Jul. 17, 2002

(65) Prior Publication Data

US 2002/0186496 A1 Dec. 12, 2002

Related U.S. Application Data

(63) Continuation of application No. 09/046,723, filed on Mar. 24, 1998, now abandoned.

(51) Int. Cl.
G11B 5/584 (2006.01)
(52) U.S. Cl. .................................. 360/77.12
(58) Field of Classification Search ............. 360/77.12, 360/78.02
See application file for complete search history.

(56) References Cited

U.S. PATENT DOCUMENTS

| | | | |
|---|---|---|---|
| 2,923,781 A | 2/1960 | Gordon et al. | |
| 3,404,392 A | 10/1968 | Sordello | |
| 3,426,337 A | 2/1969 | Black et al. | |
| 3,426,377 A | 2/1969 | Black et al. | |
| 3,637,991 A | 1/1972 | Yanagawa | |
| 3,662,120 A | 5/1972 | Hess | |
| 3,768,752 A | 10/1973 | Bettini et al. | |
| 3,790,755 A | 2/1974 | Silverman | |
| 3,838,291 A | 9/1974 | Marion et al. | |
| 3,914,793 A | 10/1975 | Burnham | |
| 3,916,039 A | 10/1975 | Akashi et al. | |
| 3,980,480 A | 9/1976 | Lairidon et al. | |
| 4,008,085 A | 2/1977 | Lemahieu et al. | |
| 4,123,788 A | 10/1978 | Kruger | |
| 4,176,381 A | 11/1979 | De Neit et al. | |
| 4,275,425 A | 6/1981 | Watanabe et al. | |

(Continued)

FOREIGN PATENT DOCUMENTS

CH 586 944 4/1977

(Continued)

OTHER PUBLICATIONS

Hart, D., "Optical Servo Technique Using Moire Fringes,"*IBM Technical Disclosure Bulletin*, vol. 16, No. 9 (Feb. 1974) at p. 3020.

(Continued)

*Primary Examiner*—Wayne Young
*Assistant Examiner*—Mitchell Slavitt
(74) *Attorney, Agent, or Firm*—Morrison & Foerster LLP

(57) ABSTRACT

A magnetic storage medium formed on a front major surface of a tape substrate defines a multiplicity of longitudinal data recording and playback tracks, each track having a nominal lateral location relative to the other tracks: and a predetermined optically manifested track servo pattern defined on the back major surface of the tape for indicating lateral displacement of the tape from a nominal lateral location of the track during tape movement across a read/write head. A magnetic tape recording and playback system employing the magnetic storage medium is also disclosed.

15 Claims, 9 Drawing Sheets

U.S. PATENT DOCUMENTS

| | | | |
|---|---|---|---|
| 4,313,143 A | 1/1982 | Zarr | |
| 4,315,283 A | 2/1982 | Kinjo et al. | |
| 4,340,305 A | 7/1982 | Smith et al. | |
| 4,371,904 A | 2/1983 | Brooke | |
| 4,380,032 A | 4/1983 | Pfost | |
| 4,424,111 A | 1/1984 | Zielke et al. | |
| 4,558,383 A | 12/1985 | Johnson | |
| 4,570,191 A | 2/1986 | Di Stefano et al. | |
| 4,578,311 A | 3/1986 | Ishikuro et al. | |
| 4,626,469 A | 12/1986 | Yamaguchi et al. | |
| 4,633,451 A | 12/1986 | Ahn et al. | |
| 4,679,104 A | 7/1987 | Dahlerud | |
| 4,737,877 A | 4/1988 | Krongelb et al. | |
| 4,746,542 A | 5/1988 | Chino et al. | |
| 4,750,067 A | 6/1988 | Gerfast | |
| 4,802,030 A | 1/1989 | Henry et al. | |
| 4,816,939 A | 3/1989 | Ford et al. | |
| 4,816,941 A | 3/1989 | Edel et al. | |
| 4,843,494 A | 6/1989 | Cronin et al. | |
| 4,848,698 A | 7/1989 | Newell et al. | |
| 4,868,046 A | 9/1989 | Moriizumi et al. | |
| 4,876,886 A | 10/1989 | Bible et al. | |
| 4,884,260 A | 11/1989 | Bouldin et al. | |
| 4,935,835 A | 6/1990 | Godwin et al. | |
| 4,937,810 A | 6/1990 | Drexler et al. | |
| 4,958,245 A | 9/1990 | Roth et al. | |
| 4,961,123 A | 10/1990 | Williams et al. | |
| 4,969,058 A | 11/1990 | Williams et al. | |
| 4,983,496 A | 1/1991 | Newell et al. | |
| 5,008,765 A | 4/1991 | Youngquist | |
| 5,016,240 A | 5/1991 | Strandjord et al. | |
| 5,038,030 A | 8/1991 | Hayashi et al. | |
| 5,050,017 A | 9/1991 | Carr et al. | |
| 5,063,489 A | 11/1991 | Inaba | |
| 5,065,387 A | 11/1991 | Roth et al. | |
| 5,067,039 A | 11/1991 | Godwin et al. | |
| 5,105,322 A | 4/1992 | Steltzer | |
| 5,120,927 A | 6/1992 | Williams et al. | |
| 5,121,371 A | 6/1992 | Farnsworth et al. | |
| 5,163,032 A | 11/1992 | Van Nieuwland et al. | |
| 5,196,297 A | 3/1993 | Dombrowski et al. | |
| 5,196,969 A | 3/1993 | Iwamatsu et al. | |
| 5,210,672 A | 5/1993 | Ivers et al. | |
| 5,218,595 A | 6/1993 | Lehureau et al. | |
| 5,229,620 A | 7/1993 | Pahr | |
| 5,262,908 A | 11/1993 | Iwamatsu et al. | |
| 5,279,775 A | 1/1994 | Thomas et al. | |
| 5,280,402 A | 1/1994 | Anderson et al. | |
| 5,283,773 A | 2/1994 | Thomas et al. | |
| 5,311,378 A | 5/1994 | Williams et al. | |
| 5,319,507 A | 6/1994 | Umebayashi et al. | |
| 5,322,987 A | 6/1994 | Thomas et al. | |
| 5,333,091 A | 7/1994 | Iggulden et al. | |
| 5,349,484 A | 9/1994 | Koehler | |
| 5,363,255 A | 11/1994 | Ivers et al. | |
| 5,369,631 A | 11/1994 | Hwang | |
| 5,371,636 A | 12/1994 | Nayak et al. | |
| 5,379,170 A | 1/1995 | Schwarz | |
| 5,379,283 A | 1/1995 | Miyajima | |
| 5,414,578 A | 5/1995 | Lian et al. | |
| 5,414,585 A | 5/1995 | Saliba | |
| 5,430,594 A | 7/1995 | Umebayashi et al. | |
| 5,432,652 A | 7/1995 | Comeaux et al. | |
| 5,448,430 A | 9/1995 | Bailey et al. | |
| 5,450,257 A | 9/1995 | Tran et al. | |
| 5,452,152 A | 9/1995 | Rudi | |
| 5,457,586 A | 10/1995 | Solhjell | |
| 5,462,823 A | 10/1995 | Evans et al. | |
| 5,501,944 A | 3/1996 | Hill | |
| 5,510,140 A | 4/1996 | Kurose et al. | |
| 5,515,212 A | 5/1996 | Chiao et al. | |
| 5,518,804 A | 5/1996 | Mizuno et al. | |
| 5,523,904 A | 6/1996 | Saliba | |
| 5,532,042 A | 7/1996 | Kawarai et al. | |
| 5,535,069 A | 7/1996 | Chiao et al. | |
| 5,535,190 A | 7/1996 | Moore et al. | |
| 5,563,868 A | 10/1996 | Farnsworth et al. | |
| 5,566,033 A | 10/1996 | Frame et al. | |
| 5,589,247 A | 12/1996 | Wallack et al. | |
| 5,615,205 A | 3/1997 | Belser | |
| 5,661,616 A | 8/1997 | Tran et al. | |
| 5,661,823 A | 8/1997 | Yamaguchi et al. | |
| 5,674,583 A | 10/1997 | Nakayama et al. | |
| 5,675,448 A | 10/1997 | Molstad et al. | |
| 5,677,806 A | 10/1997 | Eckberg et al. | |
| 5,680,278 A | 10/1997 | Sawtell, Jr. | |
| 5,689,384 A | 11/1997 | Albrecht et al. | |
| 5,696,755 A | 12/1997 | Leonhardt | |
| 5,705,268 A | 1/1998 | Ishikawa et al. | |
| 5,718,964 A | 2/1998 | Naoe et al. | |
| 5,726,834 A | 3/1998 | Eckberg et al. | |
| 5,877,910 A | 3/1999 | Williams et al. | |
| 6,033,752 A | 3/2000 | Suzuki et al. | |
| 6,075,678 A | 6/2000 | Saliba | |
| 6,084,740 A | 7/2000 | Leonhardt et al. | |
| 6,103,365 A | 8/2000 | Ishii et al. | |
| 6,108,434 A | 8/2000 | Cox et al. | |
| 6,137,642 A * | 10/2000 | Inoue | 369/53.24 |
| 6,236,529 B1 | 5/2001 | Leonhardt et al. | |
| 6,246,535 B1 | 6/2001 | Saliba et al. | |
| 6,549,363 B1 | 4/2003 | Leonhardt et al. | |

FOREIGN PATENT DOCUMENTS

| | | |
|---|---|---|
| DE | 24 06 292 | 8/1975 |
| DE | 26 16 362 | 11/1977 |
| DE | 32 01 935 | 8/1983 |
| DE | 34 17 426 | 11/1985 |
| DE | 34 17 426 A1 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 461 | 7/1992 |
| EP | 0 549 845 | 7/1993 |
| EP | 0 549 854 | 7/1993 |

| | | |
|---|---|---|
| EP | 0 555 511 | 8/1993 |
| EP | 0 564 187 | 10/1993 |
| EP | 0 645 043 | 12/1993 |
| EP | 0 645 044 | 12/1993 |
| EP | 0 655 960 | 12/1993 |
| EP | 0 598 503 | 5/1994 |
| EP | 0 606 710 | 7/1994 |
| EP | 0 684 597 | 11/1995 |
| FR | 2 315 142 | 1/1977 |
| GB | 2 008 290 | 5/1979 |
| GB | 1 595 136 | 8/1981 |
| GB | 2 121 227 | 12/1983 |
| JP | 56-111169 | 9/1981 |
| JP | 57-050346 | 3/1982 |
| JP | 57-120230 | 7/1982 |
| JP | 57-120255 | 7/1982 |
| JP | 61-142530 | 6/1986 |
| JP | 61-293372 | 12/1986 |
| JP | 62-192025 | 8/1987 |
| JP | 63-148416 | 6/1988 |
| JP | 63-251924 | 10/1988 |
| JP | 64-070916 | 3/1989 |
| JP | H1-311433 | 12/1989 |
| JP | 2-169915 | 6/1990 |
| JP | 3-094881 | 4/1991 |
| JP | 3-141087 | 6/1991 |
| JP | 3-201215 | 9/1991 |
| JP | 3-219432 | 9/1991 |
| JP | 3-242816 | 10/1991 |
| JP | 4-003832 | 1/1992 |
| JP | 4-038632 | 2/1992 |
| JP | 4-059399 | 2/1992 |
| JP | H4-38632 | 2/1992 |
| JP | 4-252417 | 9/1992 |
| JP | 4-305844 | 10/1992 |
| JP | 5-073883 | 3/1993 |
| JP | 6-020414 | 1/1994 |
| JP | 6-139549 | 5/1994 |
| JP | 6-243619 | 9/1994 |
| JP | 6-259736 | 9/1994 |
| JP | 06243619 A | 9/1994 |
| JP | 7-029136 | 1/1995 |
| JP | 7-057412 | 3/1995 |
| JP | 7-065434 | 3/1995 |
| JP | 7-220255 | 8/1995 |
| JP | 7-082626 | 9/1995 |
| JP | 8-174669 | 7/1996 |
| JP | 9-007131 | 1/1997 |
| JP | 9-033773 | 2/1997 |
| JP | 9-035246 | 2/1997 |
| JP | 9-265626 | 10/1997 |
| JP | 09/289885 | 10/1997 |
| JP | 9-288813 | 11/1997 |
| JP | 9-289885 | 11/1997 |
| JP | 9-289973 | 11/1997 |
| JP | 9-293230 | 11/1997 |
| JP | 9-297914 | 11/1997 |
| JP | 09/337733 | 11/1997 |
| JP | 9-320197 | 12/1997 |
| JP | 10-043924 | 2/1998 |
| KR | 9406847 | 7/1994 |
| SU | 1137513 | 1/1985 |
| WO | WO 83/01858 | 5/1983 |
| WO | WO 85/02933 | 7/1985 |
| WO | WO 85/03376 | 8/1985 |
| WO | WO 88/02168 | 3/1988 |
| WO | WO 94/12975 | 6/1994 |

OTHER PUBLICATIONS

Aviram, A., et al., "Optical Recording of Servo Pattern on Magnetic Disks,"*IBM Technical Disclosure Bulletin*, vol. 27 No. 7A (Dec. 1984) at pp. 3994-3995.

Acosta, R. E., et al., "Floppy Disk Embossing for Servo Applications,"*IBM Technical Disclosure Bulletin*, vol. 21 No. 10 (Mar. 1979) at pp. 4259-4260.
Schneider, J., Optical Servo Information on Magnetic Disks, *IBM Technical Disclosure Bulletin*, vol. 16 No. 4 (Sep. 1973) at p. 1082.
Hoagland, A., "Optical Servo of Magnetic Recording,"*IBM Technical Disclosure Bulletin*, vol. 20 No. 10 (Mar. 1978) at pp. 4108-4109.
Farnsworth, S., et al., "Diffractive Optical System for Tracking on Floptical®Disks," proceedings of SPIE Conference on *Design of Optical Instruments*, SPIE vol. 1690 (1992) at pp. 72-79.
Koshino, N., et al., "Optical Method of the Head Positioning in Magnetic Disk Systems,"*IEEE Transactions on Magnetics*, vol. MAG-16, No. 5 (Sep. 1980) at pp. 631-633.
Bartolini, R.A., et al., "Review and Analysis of Optical Recording Media," from Optical Engineering, vol. 15(2), pp. 99-108, reprinted in *Selected Papers on Optical Storage* (SPIE 1992) at 488-497.
Bartolini, R.A., et al., "Optical Disk Systems Emerge," IEEE Spectrum (Aug. 1978) pp. 20-28, reprinted in *Selected Papers on Optical Storage* (SPIE 1992) at 507-515.
Mendez, J., "A Unified Theory for WORM Media Modeling," in Proceedings of SPIE, vol. 899, *Optical Storage Technology & Applications* (1988) at 244-252, describes a variety of laser recordable WORM media.
Haskal, H., "Dynamics of pit formation in abiative optical recording," in Proceedings of SPIE, vol. 382, *Optical Data Storage* (1983) at pp. 174-181.
Shepherd, J., "Organic optical storage media for short wavelength systems," in Proceedings of SPIE, vol. 899, *Optical Storage Technology & Applications* (1988).
Unno Y., et al., "Development of optical recording disk and devices," in Proceedings of SPIE, vol. 382, *Optical Data Storage* (1983) at pp. 32-38.
Howe, G., et al., "Digital optical recording in infrared-sensitive organic polymers," in Proceedings of SPIE, vol. 382, *Optical Data Storage* (1983) at pp. 103-115.
Chen M., et al., "Two-regime ablative hole formation process in tellurium and tellurium-alloy films," in Proceedings of SPIE, vol. 382, *Optical Data Storage* (1983) at pp. 182-187.
Lee W., et al., "Stability of thin Te and Te-alloy films for optical data storage," in Proceedings of SPIE, vol. 382, *Optical Data Storage* (1983) at pp. 282-289.
Oakley, W., "A Novel Digital Optical Tape Recorder," in Proceedings of SPIE Conference on *High-Density Data Recording and Retrieval Technologies* (SPIE vol. 2604, 1996) pp. 256-262 (describes use of Kodak phase change optical tape).
Gelbart D., "An Optical Tape Recorder Using Linear Scanning," in Proceedings of SPIE Conference on *Optical Data Storage* (SPIE vol. 1316 1990) at pp. 65-68 (describes use of optical tape from Imperial Chemical Inc.).
Larsen, T., et al., "A New Tape Product for Optical Data Storage," in Japan J. Appl. Physics, vol. 32 (Nov. 1993) at 5461-5462. [QUANT024358-024359].
Thomas, F., Manufacture of 21 MB Floptical®disk using acousto-optically controlled laser ablation process, SPIE Conference on *Lasers as Tools for Manufacture* (SPIE vol. 529) (1985) at pp. 113-124.
Uijen, C.M.J. "Reversible Optical Recording: phase-change media and magneto optics," in Proceedings of SPIE Conference on Optical Mass Data Storage (SPIE vol. 529) (1985) at pp. 2-5.
Mathur P., "Survey of Digital Tape Transport Servo Systems," in Proceedings of SPIE Conference on High-Density Data Recording and Retrieval Technologies (SPIE vol. 2604) (1995) at pp. 210-217.
Strandjord, A., "Flexible Storage Medium for Write-Once Optical Tape," in Proceedings of SPIE Optical Data Storage (SPIE vol. 1663) (1992) at pp. 362-371.
Lind, M.A.., "Performance of a Reversible Dye-Polymer Optical Recording Medium," in Proceedings of SPIE Conference in Optical Storage Technology and Applications (SPIE vol. 899) (1988) at pp. 211-218.
Leibbrandt, G.W.R., "Optical Tape System; Evaluation of Recorder and Media," in Proceedings of SPIE Conference on Optical Data Storage '97 (SPIE vol. 3109) (1997) at pp. 106-115.

Narahara, T., "Tracking Method of Optical Tape Recorder Using Acousto-Otic Scanning." in Proceedings of SPIE on Optical Data Storage '91 (SPIE vol. 1499) (1991) at pp. 120-128.

Eaton, J., "Magnetic Tape Trends and Futures," in Proceedings of SPIE on High-Density Data Recording and Rertrieval Technologies (SPIE vol. 2604) (1995) at pp. 146-157.

Godwin, J., "An Introduction to the Insite 325 Floptical®Disk Drive," in Proceedings of SPIE on Optical Data Storage Topical Meeting (vol. 1078) (1989) at pp. 71-80.

Brock, P., "Generation of Optical Disk Servo Patterns by Lithographic Imaging of Photodeformable Polymers," in Proceedings of SPIE on Optical Data Storage (vol. 1316) (1990) at pp. 180-191.

Briggs, J., "Enabling Technologies for a 100MB 3.5" Floppy (ZIP™) Disk Drive, in Proceedings of SPIE on High-Density Data Recording and Retrieval Technologies (vol. 2604) (1995) at pp. 220-227.

Answer, Counterclaims and Jury Demand of Defendant Quantum to Complaint For Patent Infringement dated May 6, 2003.

Defendant Quantum's First Supplemental Response to Plaintiff Storage Technology's Interrogatory No. 4.

Defendant Quantum's Second Supplemental Response to Plantiff Storage Technology's Interrogatory No. 4.

Expert Report of Arthur Moore regarding Invalidity of the '363 and '529 Patents dated Dec. 13, 2004.

Expert Report of James Lemke regarding Invalidity of the '363 and '529 Patents dated Dec. 13, 2004.

Supplemental Expert of James Lemke reguarding invalidity of the '363 and '529 Patents dated Dec. 20, 2004.

Expert Report of Jimmy Godwin reguarding Invalidity of the '363 and '529 Patents dated Dec. 13, 2004.

Defendant Quantum's Notice to Storage Technology Pursuant to 35 U.S.C. 282 dated Feb. 18, 2005.

Amendment in U.S. Appl. No. 10/346,197 dated Dec. 7, 2004.

Office Action in U.S. Appl. No. 10/346,197 dated Feb. 7, 2005.

Findings, Conclusions and Order Denying Plantiff's Motion for Preliminary Injuction dated May 17, 2005.

* cited by examiner

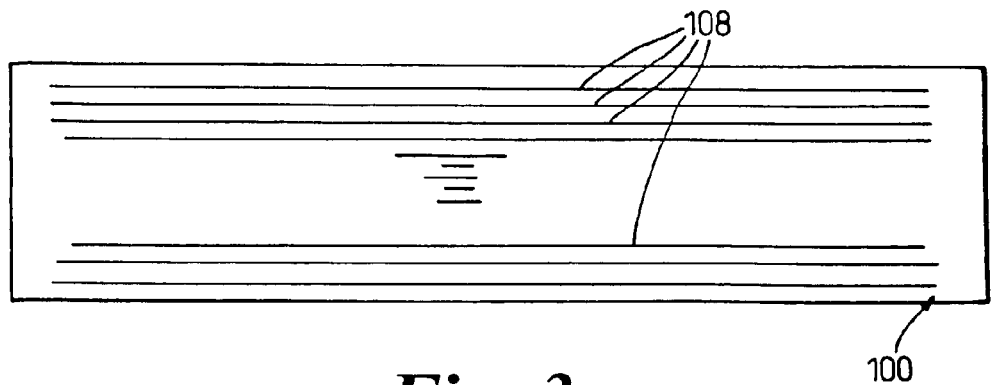
Fig. 3
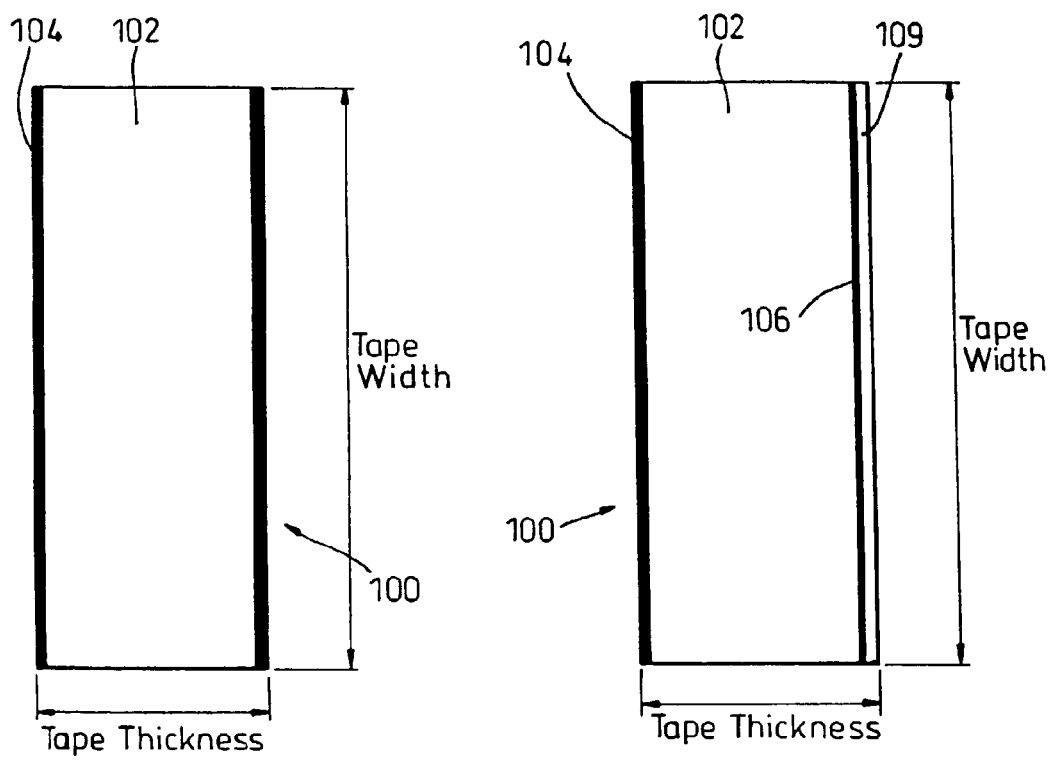
Fig. 4
(PRIOR ART)
Fig. 4A

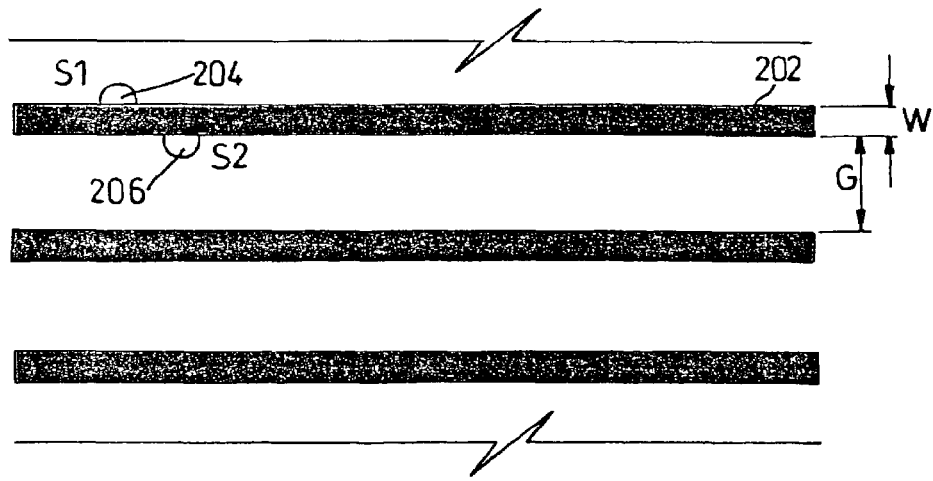
Fig. 6
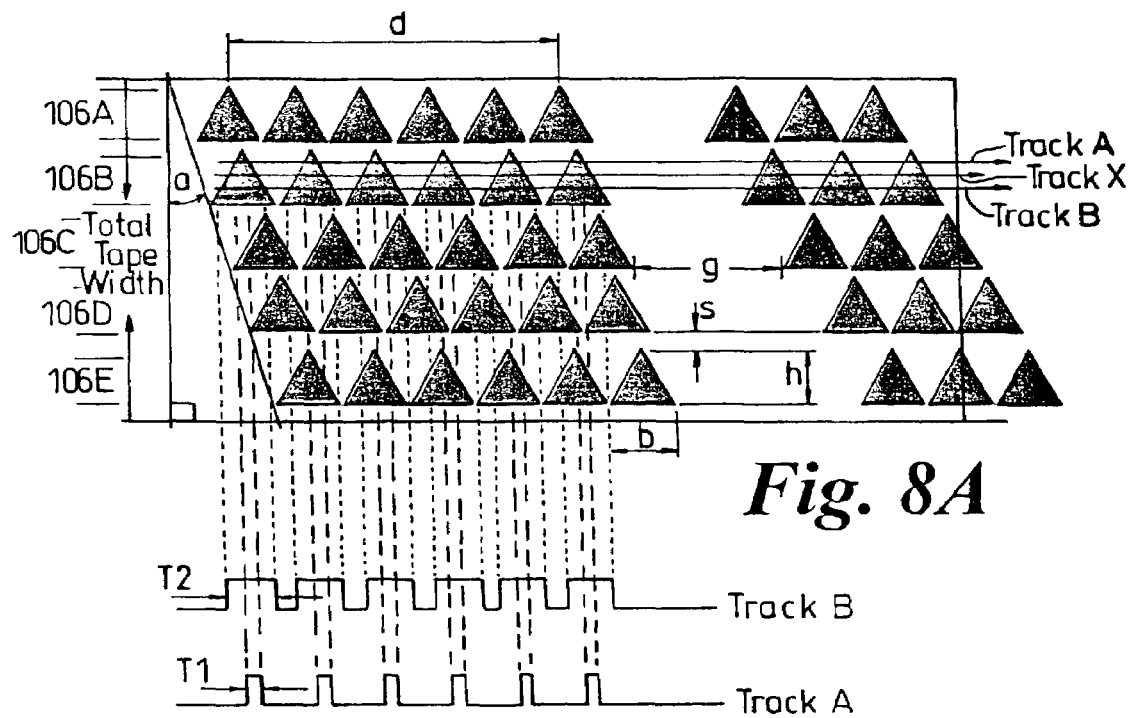
Fig. 8A
Fig. 8B

Output of detection circuit

MULTI-CHANNEL MAGNETIC TAPE SYSTEM HAVING OPTICAL TRACKING SERVO

REFERENCE TO RELATED APPLICATION

This application is a continuation of U.S. application Ser. No. 09/046,723, filed Mar. 24, 1998, now abandoned. This application is related to commonly assigned U.S. patent application Ser. No. 09/046,873 (now abandoned), filed on Mar. 24, 1998, and entitled "Dual-Actuator Pivoting Lever Tape Head Positioner", George A. Saliba, Inventor, the disclosure thereof being incorporated herein by reference.

FIELD OF THE INVENTION

The present invention relates to magnetic tape recording. More particularly, the present invention relates to a multi-channel magnetic tape recording system employing an optical tracking servo to sense and correct for lateral tape motion, and lateral track motion, as the tape is drawn longitudinally across a head transducer assembly.

BACKGROUND OF THE INVENTION

Digital tape recording remains a viable solution for storage of massive amounts of data. Conventionally, at least two approaches are employed for recording of digital information onto magnetic recording tape. One approach calls for moving the tape past a rotating head structure which records and plays back user information from discontinuous transverse tracks. Interactive servo systems are employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is being required of all commercially viable mass storage devices and media. In the case of linear tape recording a popular trend is toward multi-head, multi-channel fixed head structures with narrowed recording gaps and track widths so that many linear tracks may be achieved on a tape medium of predetermined width, such as one-half inch width tape. Tape substrates are also being made thinner, with increased tape lengths being made possible in small diameter reel packages.

Because of a relatively high linear tape velocity, and because tape substrates continue to be made thinner and thinner, guiding tape past a tape head structure along an accurate invariant linear path has proven to be highly problematical. One error phenomena is known as "lateral tape motion" or "LTM". LTM is a major source of tracking errors in linear tape recording. One approach to minimizing LTM tracking errors is to provide a multi-roller tape guide structure, such as the type described in commonly assigned U.S. Pat. No. 5,414,585 entitled: "Rotating Tape Edge Guide", the disclosure thereof being incorporated herein by reference. While this approach has provided a viable "open loop" solution to LTM, with the advent of new head technologies, such as magneto-resistive read heads, and new higher coercivity recording media, track widths may be very small, and many additional tracks may be defined on the tape. Unfortunately, a limiting factor is LTM, and at some track width dimension and track density, it is not possible to follow the tape accurately enough to provide reliable performance.

One solution to correction for LTM has been to record or pre-record magnetic servo tracks (i.e. "servowrite") onto the tape before it reaches the user. These tapes are known in the art as "preformatted" tapes, and the step of recording accurate servo tracks onto the tape is both time consuming and expensive. Examples of tape systems employing preformatted tapes are given by U.S. Pat. No. 5,432,652 entitled: "Servo and Data Format for Magnetic Tape Having Plural Spaced-Apart Servo Areas Interleaved with Data Track Areas Having Serpentine Track Scanning Using Any One of a Plurality of Number of Concurrently Accessed Tracks." Another example is provided by U.S. Pat. No. 5,675,448 entitled: "Track Pitch Error Compensation System for Data Cartridge Tape Drives".

Once the decision has been made to provide separate magnetic servo tracks or to embed servo information within the magnetic user data tracks recorded onto the tape, a suitable coarse position/fine position actuator mechanism must be added to the tape drive. One example of a stepper motor/voice coil actuator is provided by U.S Pat. No. 5,280,402 entitled: "Combined Stepper Motor and Voice Coil Head Positioning Apparatus".

Optical servo tracks have been provided within floppy disks. One example of a floppy disk and compatible drive is given in U.S. Pat. No. 5,065,387 entitled: "Method and Apparatus for Generating Tracking Error Signals by Means of an Optical Servo System", the disclosure thereof being incorporated herein by reference.

While these prior methods and approaches have worked within their intended applications and uses, improvements and simplifications in the medium and drive apparatus have been lacking. Accordingly, a hitherto unsolved need has remained for a multi-track, multi-channel digital streaming tape system which overcomes limitations and drawbacks of the known prior approaches.

SUMMARY OF THE INVENTION WITH OBJECTS

A general object of the present invention is to provide a tape recording system and recording tape with an optical servo pattern to enable correction of LTM in a manner overcoming limitations and drawbacks of the prior art.

In accordance with one aspect of the present invention a linear magnetic tape medium has a first surface accessible by a laterally positionable, multi-head magnetic read/write transducer assembly, and a second surface accessible by an optical servo transducer assembly physically coupled to the magnetic read/write transducer assembly. A multiplicity of linear data tracks are defined on the first surface. Each linear track provides storage of magnetic data patterns written by a head of said magnetic read/write transducer positioned and maintained thereat by a lateral head positioner. A multiplicity of linearly extending servo features are formed on the second surface and are read by the optical servo transducer which generates a servo feedback signal to aid track following in the presence of lateral tape motion by the magnetic read/write transducer as the tape medium is drawn linearly there across.

These and other objects, aspects, advantages and features of the invention will be more fully understood and appreciated upon considering the following detailed description of a preferred embodiment presented in conjunction with the accompanying drawings.

BRIEF DESCRIPTION OF THE DRAWINGS

In the Drawings:

FIG. 3 is a diagrammatic view in elevation of a first major surface of a recording tape incorporating principles of the present invention and showing a multiplicity of linear recording tracks.

FIG. 4 is a diagrammatic view in side elevation and cross-section of a conventional magnetic recording tape, and FIG. 4a is a diagrammatic view in side elevation and cross section of the new FIG. 3 recording tape, showing a first major surface providing a magnetic recording medium along with a second major surface providing an optical servo pattern in accordance with principles of the present invention.

FIG. 6 is a diagrammatic view in elevation of one optical servo pattern formed on the second major surface of the FIG. 4a recording tape as a series of linear optical reflective servo tracks.

FIG. 8A is a diagrammatic view in elevation of an alternative optical servo pattern formed on the second major surface of the FIG. 4a recording tape.

FIG. 8B is a graph of electrical servo signals generated by an optical servo head of the FIG. 1 assembly during sensing of one of the linear servo patterns shown in FIG. 8A.

DETAILED DESCRIPTION OF A PREFERRED EMBODIMENT

Figure 1:
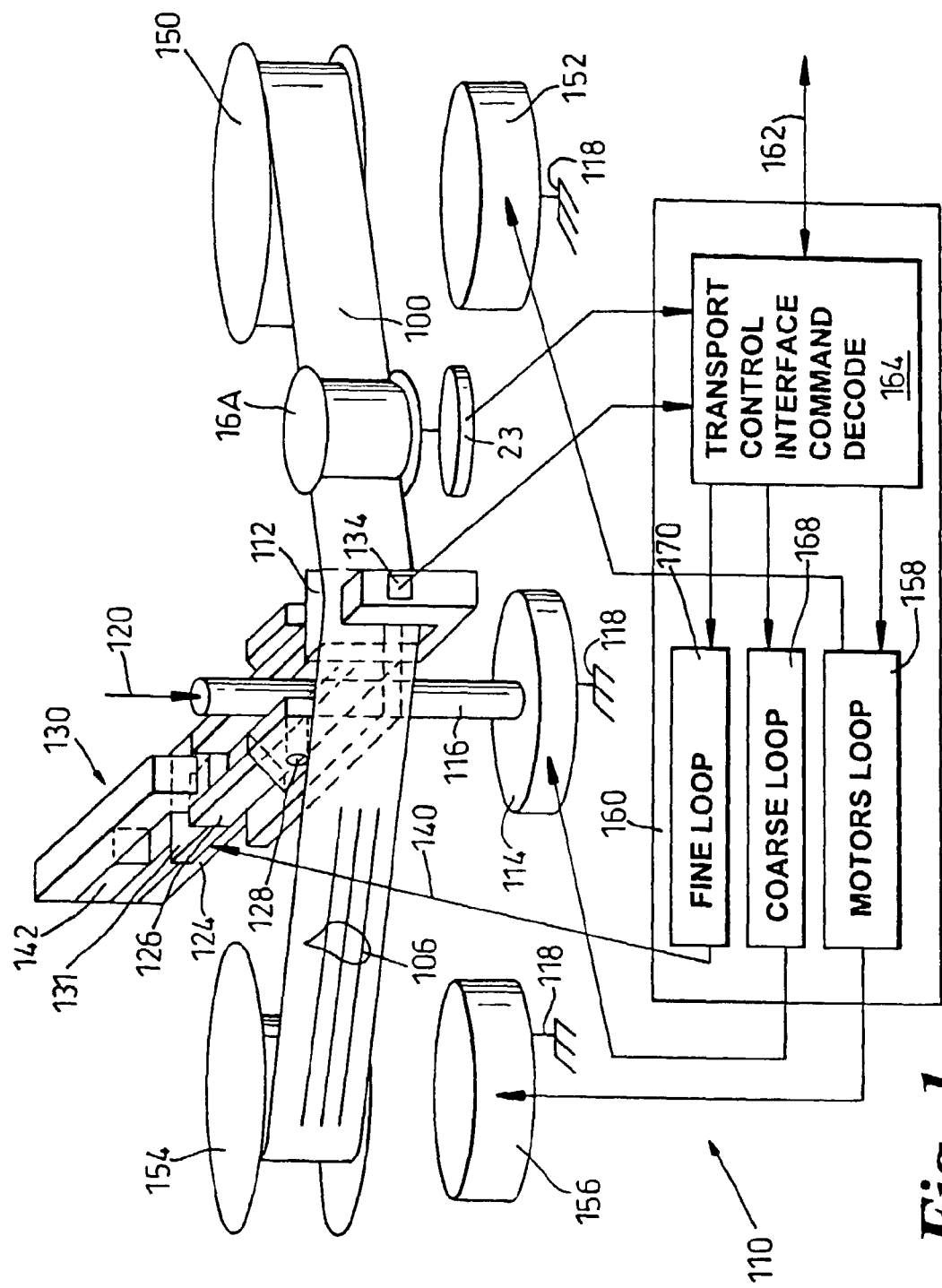
FIG. 1 is an isometric, highly diagrammatic structural and electrical block view of a multi-channel magnetic tape recording system employing an optical tracking servo to sense and correct for lateral tape motion in accordance with principles of the present invention.

Referring initially to FIG. 1, a magnetic recording tape 100 is shown being drawn through a tape drive mechanism 110 from a supply reel to a take-up reel (not shown) along a nominal linear tape path indicated by arrow TP. The tape 100 is moved at a considerable linear relative velocity, such as 150 inches per second. Because of this high relative velocity and contact between the tape 100 and mechanical tape guide and head elements of the tape drive 110, the linear movement of the tape 100 along the nominal tape path TP results in certain undesirable additional tape movements, a principal one of which being lateral tape motion ("LTM") or motion transverse to the nominal tape path as indicated by arrow LTM.

Figure 5:
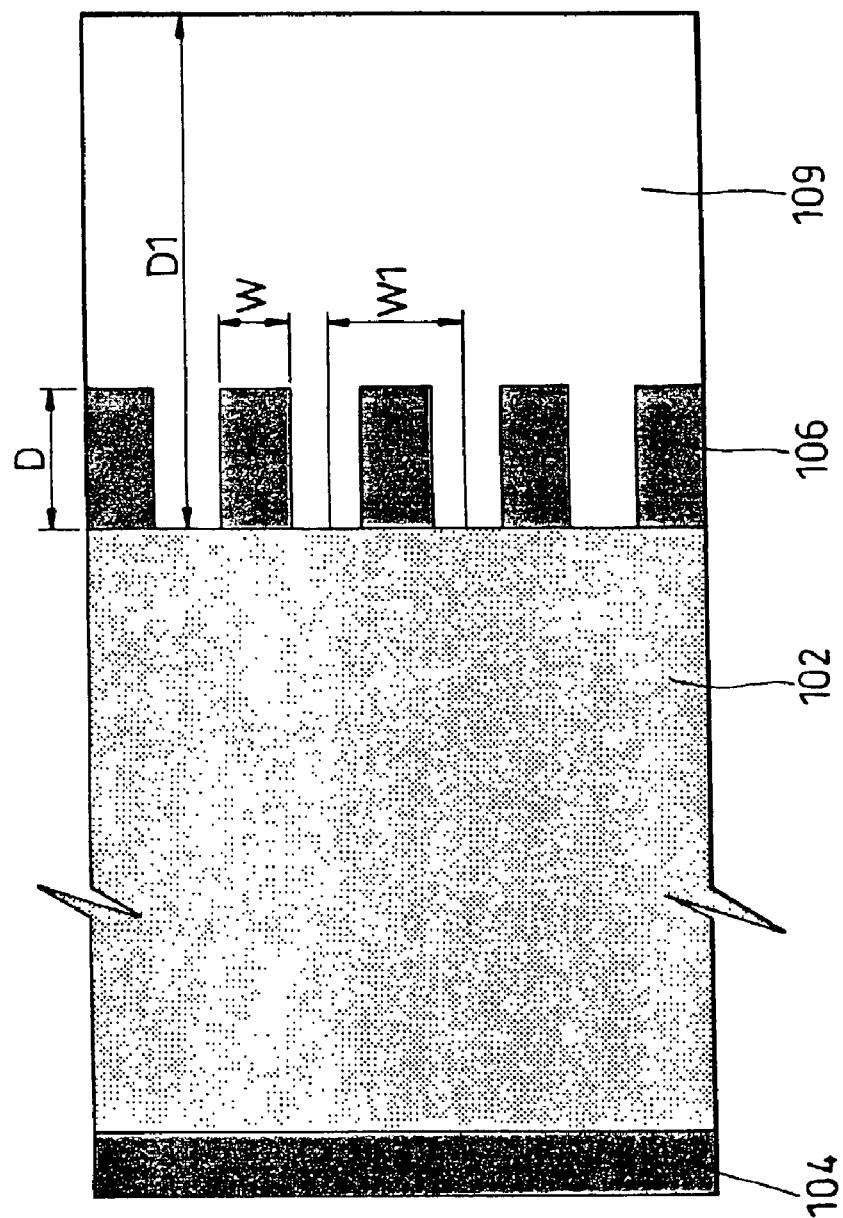
FIG. 5 is an enlarged diagrammatic front view of the FIG. 4a recording tape showing progressive removal of various layers thereof.

As discussed above, although mechanical steps are known to reduce LTM, at certain high linear track densities and narrow track widths it is not practical to rely entirely upon open loop tape mechanisms. Accordingly, the magnetic recording tape 100 includes, in addition to a plastic substrate (base film) 102 and a magnetic storage layer 104 coated onto a first major surface (FIG. 4), an optical servo pattern 106 formed so as to be viewed at a reverse major surface of the tape (FIG. 4a). In accordance with an aspect of the present invention, the optical servo pattern 106 is applied during tape manufacturing, as by printing or embossing. A thin transparent protective layer 109 is formed over the optical servo pattern 106 as shown in FIG. 4a and FIG. 5, for example.

Figure 2:
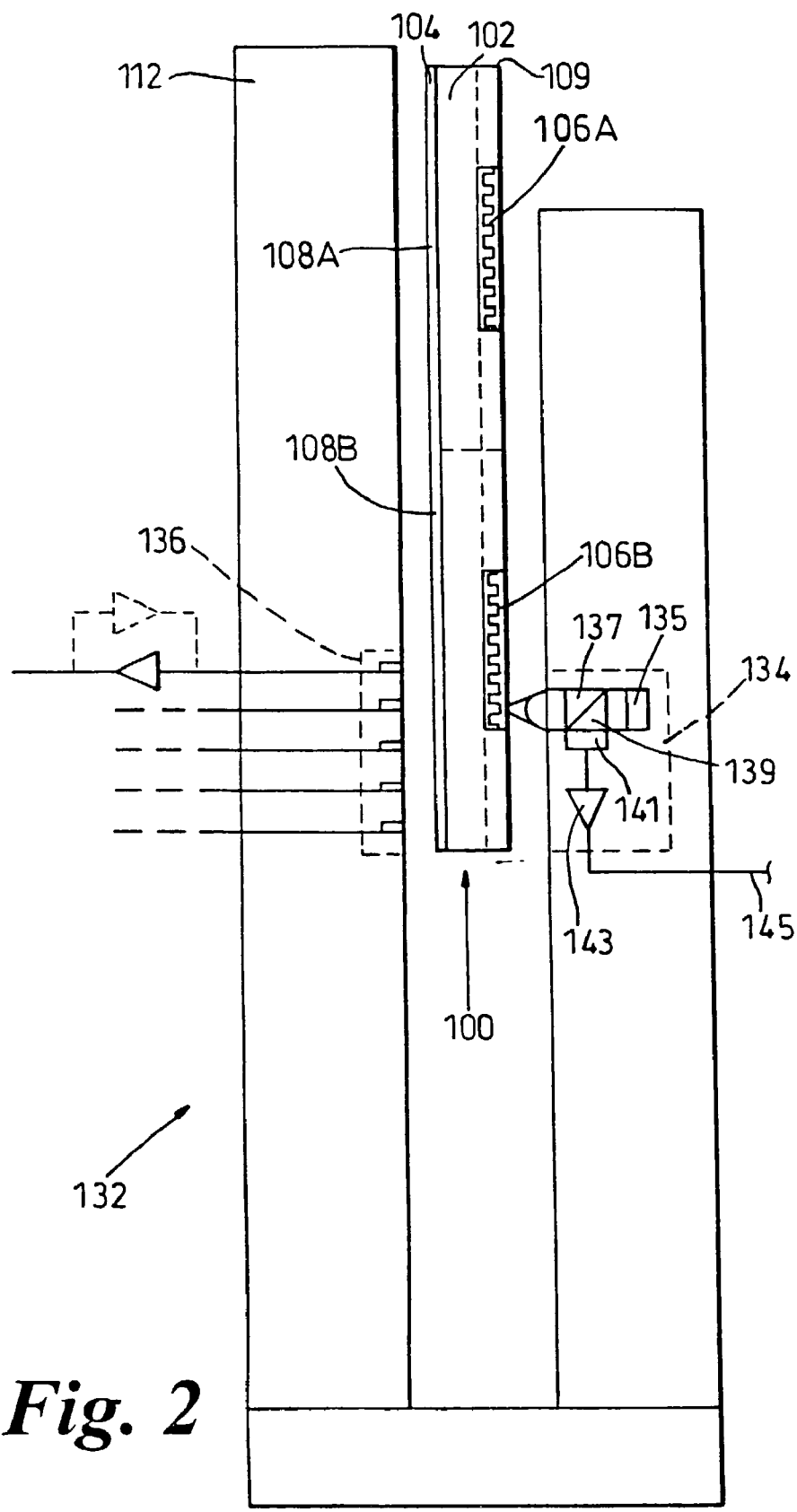
FIG. 2 is a highly diagrammatic enlarged view in elevation and cross-section of a magnetic/optical head assembly used by the FIG. 1 tape recording system.

The tape 100 provides for multiple linear magnetic data storage tracks 108 defined in the magnetic storage layer 104 (FIG. 3). Accordingly, the tape drive mechanism 110 includes a multi-channel magnetic head structure 112 having multiple read and write head elements aligned to read some, but not all of the magnetic data storage tracks 108. The write elements are preferably realized as thin film magnetic write structures, and the read elements may be thin film or magneto-resistive read elements. In FIG. 2, a head array comprising e.g. five magneto-resistive read transducers is depicted within the head structure 112. While five heads are shown, in practice ten or twelve heads are presently preferred for both writing and reading within the head structure 112. With the particular arrangement of heads shown in FIG. 2, the effective recording area of the tape 100 is divided into multiple zones or bands of parallel magnetic recording tracks 108. there being two zones 108A, and 108B shown in FIG. 2. This arrangement therefore requires a head positioner mechanism which coarsely positions the head structure 112 and head array 136 within a particular zone, e.g. zone 108B shown in FIG. 2, and at nominal track set positions within each zone. Moreover, in order to follow LTM, the head positioner mechanism must provide for very rapid head position corrections tracking the LTM offsets. Generally. this requirement is satisfied by providing a head positioner mechanism which is corrected by an optical servo pattern 106 and by an optical servo feedback control 138. In the example presented by FIG. 2 this requirement is satisfied by providing e.g. two bands of optical servo patterns 106A and 106B.

The tape drive mechanism 110 shown in FIG. 1 includes a lateral coarse head positioner, including e.g. an incremental step motor 114 and lead screw 116. The motor 114 is attached to a base 118. while the lead screw 116 may be rotationally mounted to the base 118 between the step motor 114 and a journal 120. As the step motor 114 rotates the lead screw, a lead screw follower block 122 follows the lead screw over a limited range of bi-directional lateral displacement dependent upon rotational direction of lead screw 116.

A head mounting platform or structure 124 supports a head mounting beam structure or assembly 126. The head mounting beam 126 includes a pivot or fulcrum 128 which enables the beam 126 to pivot about the platform 124 over a very limited range of rotational displacement in a lateral or transverse direction relative to a main longitudinal axis (direction of travel) of tape 100. A limited displacement force is provided by a voice coil motor 130 extending on one side of the pivot 128, while a magnetic/optical tape head assembly 132 including the head structure 112 and head array 136 is provided on an opposite side of the pivot 128. The magnetic/optical tape head assembly 132 is generally U-shaped and includes on one inside wall the multi-channel magnetic transducer head array 112, and on an opposite inside wall an optical servo head 134. The coarse head positioner therefore positions the head assembly 132 at each zone, and at each track set within the particular zone. For each track set there is provided an optical servo tracking pattern, so that if the optical servo head follows the appropriate tracking pattern during linear tape movement, the magnetic head array 136 will follow the tracks 108 of the particular track set.

A supply reel 150 supplies the tape 100 into the mechanism 110. The reel 150 is preferably a part of a single-reel tape cartridge which includes a suitable buckling mechanism. The cartridge and buckling mechanism are conventional and are not described further. The reel 150 is rotationally engaged by a supply reel drive motor 152. A take-up reel 154 within the transport 110 is controlled by a take-up reel drive motor 156. The motors 152 and 156 are controlled independently by a motors control servo loop 158 in order to provide an appropriate amount of tension on the tape 100 irrespective of the relative diameters of the tape spools formed on the reels 150 and 154 at any particular time. A tape guide roller 16A is shown coupled to a tape speed sensing device, such as tachometer 23. The tachometer 23 is used conventionally by the motors control loop 158 in controlling relative torque applied by each of the motors 150 and 152.

A transport electronics circuit 160 includes a data and command interface bus 162 enabling the transport 110 to be connected to a computing environment. An interface command decode and user data processing unit 164 provides conventional tape command decode and status functions, and user data compression and expansion functions as well as error correction processes. It also supervises the motors loop 158. a coarse head position control loop 168 and a fine head position control loop 170. The coarse head position control loop 168 is used to control the stepper motor 114 to position the head structure 112 at each nominal track set location. It should be understood that the transport 110 incudes a plurality of parallel user data channels, such as 6–12 channels, and that each nominal coarse head position locates the head structure 112 at approximately each set of 6–12 tracks. The fine head position control loop 170 responds to instantaneous tape position information sensed by e.g. the optical pickup head 134 from one of the servo track patterns 106 which corresponds to the set or group of lineal tracks presently being followed. Any positional offset or position error sensed by the optical head 134 will result in a corrective driving current passing through a voice coil 131 of the voice coil motor 130. This current will apply a torque force to the pivoting dual beam structure 126, and the head structure 112 will be returned to correct alignment with the magnetic data record tape tracks being followed as the optical head 134 follows a particular servo track pattern 106.

The optical servo track patterns 106 may provide continuous or discrete position error signals. Each track may be encoded with a unique value or code which enables the optical head and main control module 164 to determine which nominal servo track 106 is being followed. Advantageously, the servo track patterns 106 may be formed as a part of the tape manufacturing process, with the result that there need be no separate magnetic servo track writing operation as part of tape manufacturing. Conventional laser inscribing, embossing or patterning techniques may be used in real time during tape manufacture to provide the tracks 106.

As shown in FIG. 2, the optical servo head 134 may conventionally include a laser light source 135, an optical path 137 including lenses and a beam splitter 139, and a photo detector array 141 and preamplifier 143, such that a light beam may be focused upon a particular one of the servo patterns 106 on the reverse major side of the tape and result in electronically discernible LTM position error signals at the preamplifier 143. A resultant electrical error signal on a path 145 is sent to the optical servo feedback fine loop control block 170 within the control electronics 160. The block 170 generates a bi-directional head position correction driving current and applies the driving current via a path 140 to the lateral voice coil 131 of voice coil motor 130 which results in a servo bias torque. The bias torque is applied through the support structure 124 and head mounting beam structure 126 to pivot the magnetic/optical head assembly 132 about the journal 128 and thereby follow the tape 100 despite the presence of LTM. Ideally, the fine position servo feedback control block 170 operates continuously in real time to apply head position correction currents to the lateral voice coil of voice coil motor 130. The fine position servo loop has a high bandwidth, and the beam assembly 126 including voice coil 131 and head structure 132 has a low mass, such that position corrections may be applied and effected very rapidly to minimize any tracking errors.

The voice coil motor 130 includes in addition to the voice coil 131 a fixed portion 142 carrying e.g. a suitably magnetized permanent magnet. The fixed portion 142 is mechanically attached to the lead screw follower platform 122 by a suitable support bar. The voice coil 131 receives a head position correction current over the path 140 from the fine position servo feedback control block 170 and creates a magnetic field which interacts dynamically with a magnetic field provided by the permanent magnet of the fixed portion 142, such that a fine position correction force is generated which incrementally pivots the rigid beam structure 126 laterally to correct for LTM. The voice coil actuator motor 130 may comprise a permanent magnet/coil combination, or it may comprise a piezoelectric effect motive device. The head mounting structure pivot 128 may be freely rotatable relative to the bar 124 with the head mounting structure 126 mechanically biased to a neutral position, the bias being overcome by rotational force applied by the lateral voice coil actuator 130. Alternatively, the pivot 128 may be fixed to the bar 124 which thereupon functions as a torsion bar enabling limited range lateral displacement of the head mounting structure 126 in response to the driving force applied by the voice coil motor 130.

The optical servo head may comprise a suitable arrangement of light source and photo detector array, together with suitable integrated on-board amplifiers. One example of a conventional optical head is described in U.S. Pat. No. 5,615,205 to Belser entitled: "Bi-Level Optical Media Having Embossed Header Format", the disclosure thereof being incorporated herein by reference. An alternative preferred optical head may be similar to one which is described in an article by Yoshikawa, Nakanishi, Itoh, Yamazaki, Komino and Musha entitled: "Laser-Detector-Hologram Unit for Thin Optical Pick-up Head of a CD Player", *IEEE Trans. on Components. Packaging & Mfg. Tech.* Part B, Vol. 18, No. 2, May 1995, pp. 245–249, the disclosure thereof being incorporated herein by reference.

Figure 7:
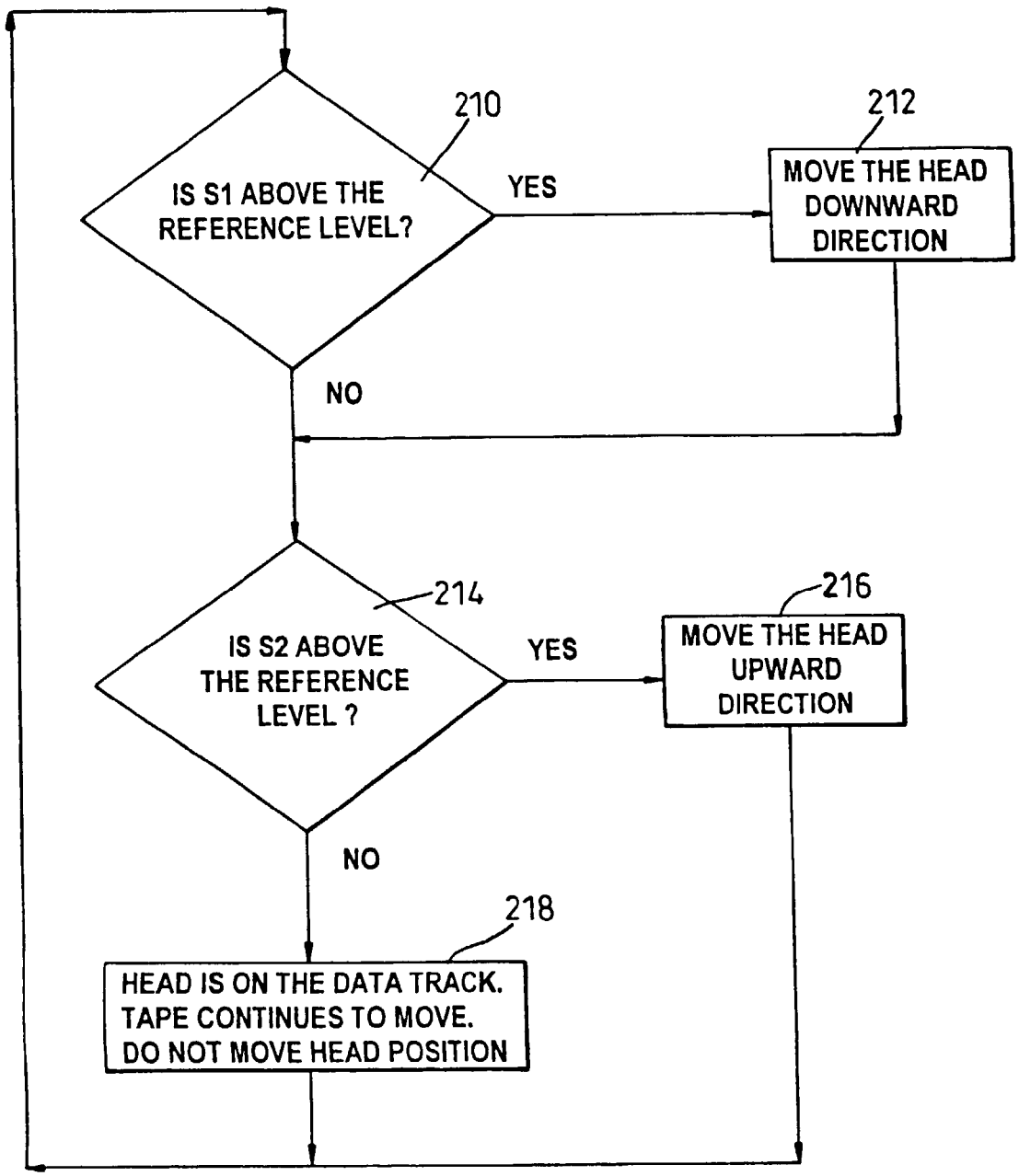
FIG. 7 is a flow diagram explaining operation of the optical tracking servo using the FIG. 6 servo pattern to enable the head to follow lateral tape motions during tape operations of the FIG. 1 system.

Turning now to FIG. 6, one preferred example of a servo pattern comprises a lineal reflective area 202. In this example two photo detectors 204 and 206 are aligned to follow opposite edges of the lineal reflective area 202. The photo detector 204 puts out an electrical signal S1. while the photo detector 206 puts out an electrical signal S2. FIG. 7 describes a control process which makes use of the FIG. 6 pattern in relation to a predetermined reference level. At a first step 210 the process determines whether the servo signal S1 is above the reference level. If so, a process step 212 causes the fine positioner to move the head structure 126 in a downward direction. If not, or following process step 212, a logical step 214 determines whether the servo signal S2 is above the reference level. If so, a process step 216 causes the head structure 126 to be moved in an upward direction, and a return is made to the initial step 210. If not, a process step 218 determines that the head structure 126 is properly aligned with the data track set, and a return is made to the initial process step 210. This process of FIG. 7, while simplified, continues in real time and includes appropriate damping so that the control loop remains stable.

Figure 9:
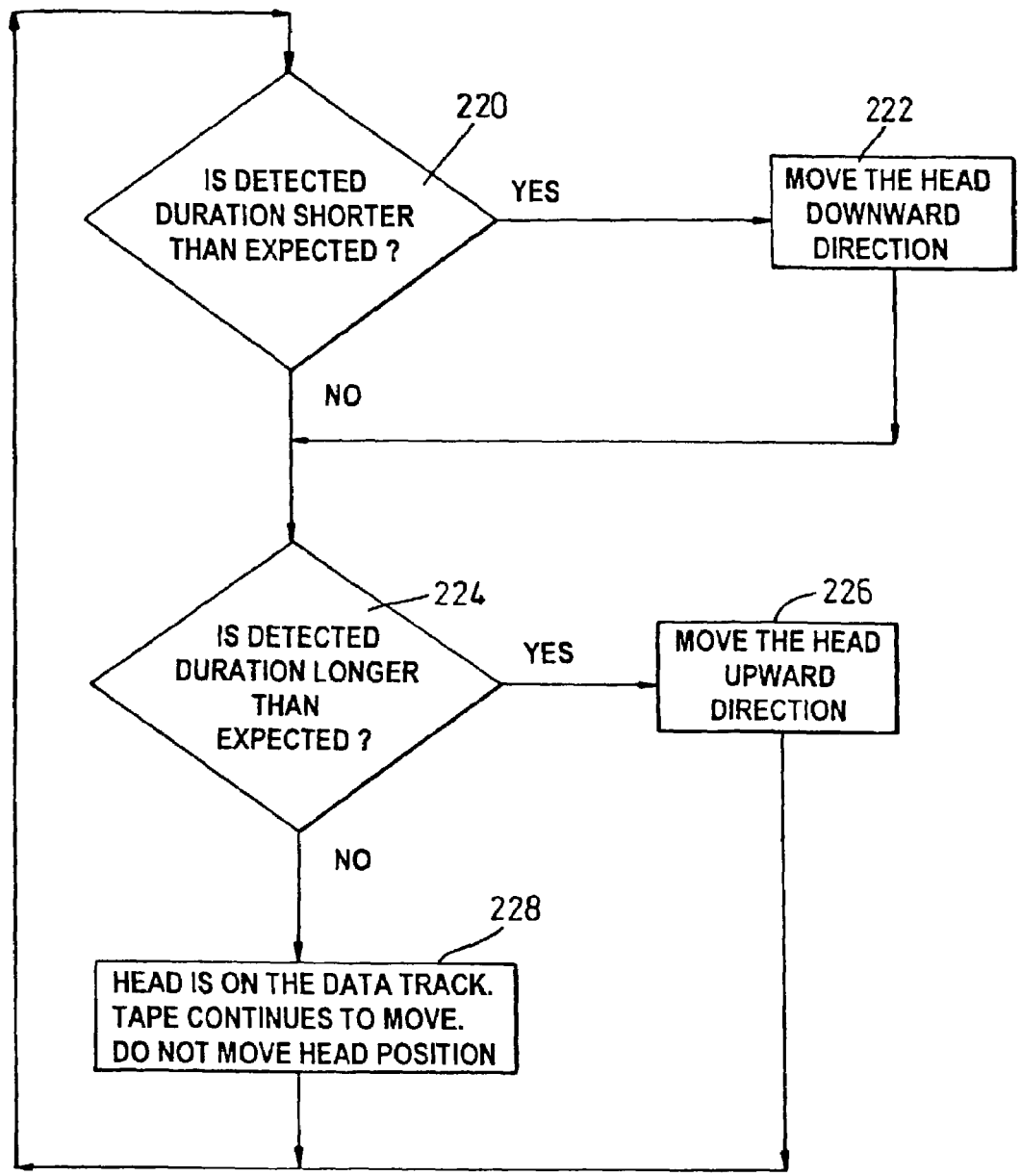
FIG. 9 is a flow diagram explaining operation of the optical tracking servo using the FIG. 8A servo pattern to enable the head to follow lateral tape motions during tape operations of the FIG. 1 system.

FIG. 8A illustrates another reflective servo pattern. In this example, there are e.g. five track set zones 106A, 106B, 106C, 106D and 106E. Each servo pattern, such as pattern for zone 106B, includes longitudinally arranged geometric reflective areas, such as equilateral triangle shapes which are equally spaced apart. As shown in FIG. 8B the interval of reflected light, in relation to the period of occurrence of the patterns, is used to determine lateral position of the tape and correct for LTM. For example, a track set A has a reflective interval T1 which is brief in relation to the period of the pattern, while a track set B has a reflective interval which is considerably longer and approaches the period of the pattern. FIG. 9 sets forth a control process which implements servo control of the head structure 126 with the FIG. 8A pattern. In the FIG. 9 process a logical step 220 determines whether the reflective pattern duration is shorter than expected for the nominal track set location. If so, a process step 222 causes the head structure 126 to be moved in e.g. a downward direction relative to the tape 100. If not, or following process step 222, a logical step 224 determines whether the reflective pattern duration is longer than expected for the particular track set location. If so, a process step 226 moves the head structure e.g. in an upward direction, and a return is made to the step 220. If not, a process step 228 determines that the head structure 126 is accurately following the nominal track set location, and a return is made to the step 220. Like the process of FIG. 7, the process of FIG. 9 operates continuously to provide closed loop fine positioning during linear movements of the tape 100 through the mechanism 110.

Figure 10A:
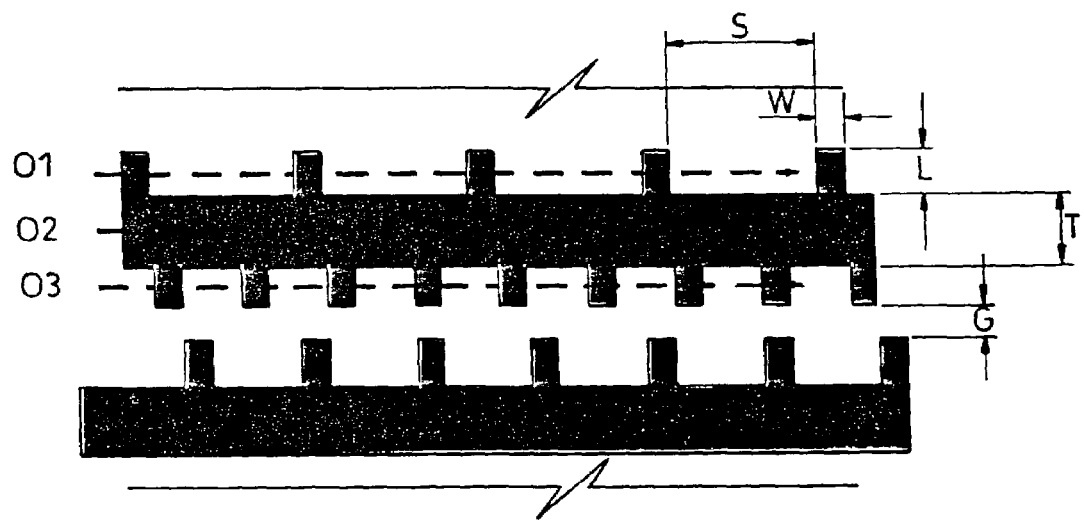
FIG. 10A is a diagrammatic view in elevation of another optical servo pattern formed on the second major surface of the FIG. 4a recording tape.
Figure 10B:
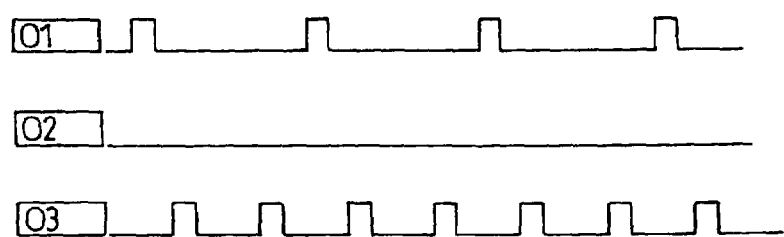
FIG. 10B is a graph of electrical servo signals generated by an optical servo head of the FIG. 1 assembly during sensing of the FIG. 10A pattern over a linear track during tape operations.
Figure 11:
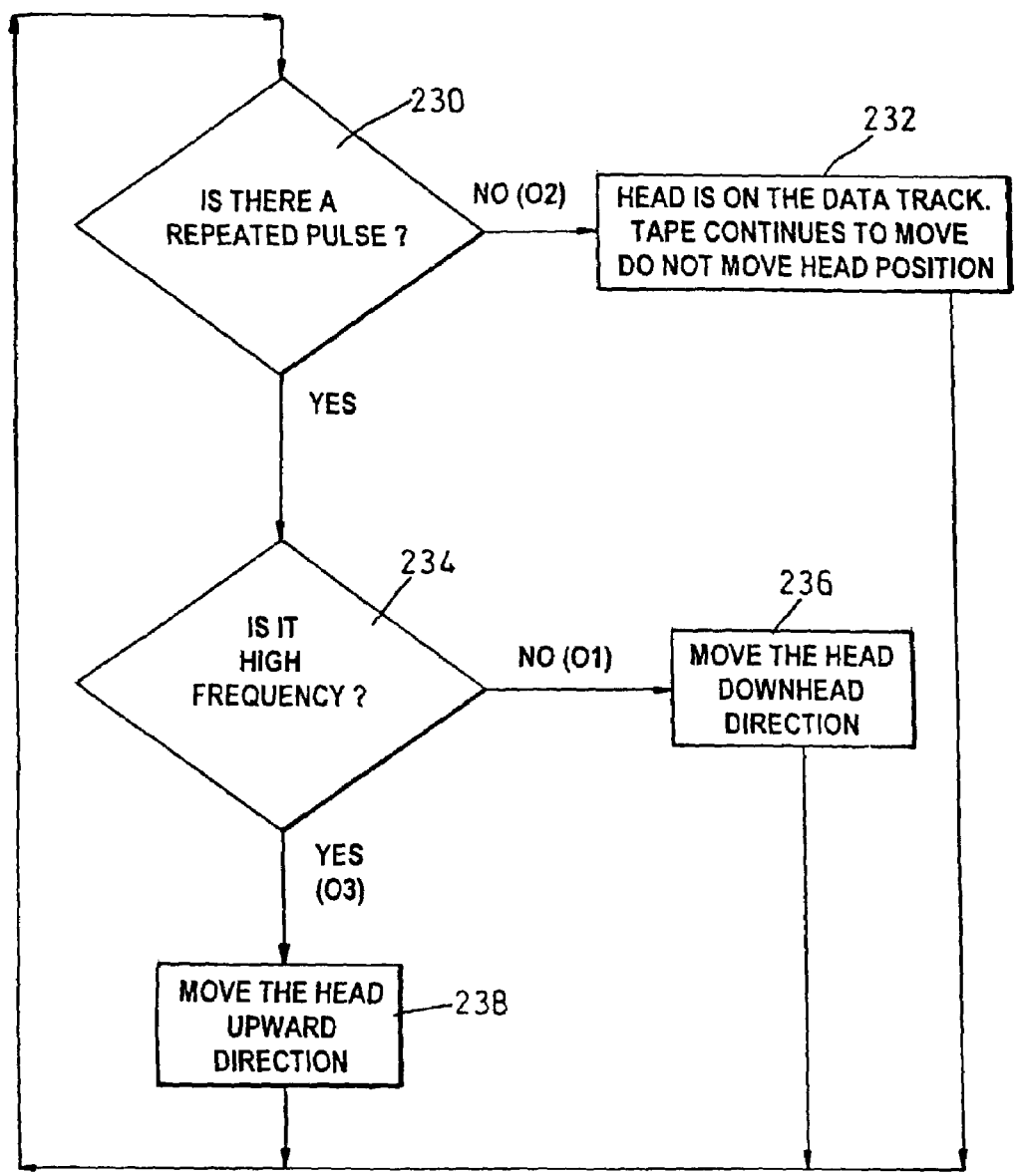
FIG. 11 is a flow diagram explaining operation of the optical tracking servo using the FIG. 10A servo pattern to enable the head to follow lateral tape motions during tape operations of the FIG. 1 system.

FIG. 10A illustrates yet another reflective servo pattern for each track set location. In this particular pattern a continuous linear reflective area has two periodic lateral reflective patterns along opposite major edges. As shown in FIG. 10B, one periodic pattern O1 provides a relatively low frequency electrical servo signal, which the other periodic pattern O3 provides a relatively high frequency electrical servo signal. A continuous on track pattern O2 has no periodic component. FIG. 11 sets forth a control process which makes use of the FIG. 10A pattern. A first logical step 230 determines if a repeated pulse is present in the servo signal. If not, a process step 232 determines that the head structure 126 is properly following the nominal track set and a return is made to the step 230. If so, a logical step 234 determines if e.g. a high frequency pattern is present. If not, a process step 236 impliedly determines that the low frequency pattern is present and moves the head structure 126 e.g. in a downward direction and thereupon returns to the initial step 230. If so, a process step 238 moves the head structure 126 in an upward direction and then returns to the initial process step 230.

The optical servo pattern can also make use of the diffractive property of light energy, creating a reflective pattern with overlapped reflective orders. If diffraction is used, pattern constraints will be selected to be compatible with the resultant diffraction, reflection patterns.

While the method and apparatus of the present invention have been summarized and explained by illustrative embodiments and applications in magnetic tape recording, it will be readily apparent to those skilled in the art that many widely varying embodiments and applications are within the teaching and scope of the present invention, and that the examples presented herein are by way of illustration only and should not be construed as limiting the scope of this invention, which is more particularly set forth in the following claims.

What is claimed is:

1. A tape drive system for use with a tape having a magnetic side and an optical side with optical servo tracks formed thereon, the tape drive system comprising:
    a movable optical head which detects information relating to the optical servo tracks;
    a movable magnetic head which reads and writes data on the magnetic side of the tape;
    an assembly which couples movement of the magnetic head to movement of the optical head;
    a motor which controls movement of the assembly;
    an optical servo control system which controls movement of the assembly based on the information relating to the optical servo tracks detected by the optical head, wherein the optical servo control system includes a fine position servo loop, the fine position servo loop outputting a signal to control the motor based on the information relating to the optical servo tracks; and
    a pivoting beam structure coupled between the motor and the assembly, the motor applying a torque force to the pivoting beam structure that causes movement of the assembly.

2. A tape drive system for use with a tape having a magnetic side and an optical side with optical servo tracks formed thereon, the tape drive system comprising:
    a movable optical head which detects information relating to the optical servo tracks;
    a movable magnetic head which reads and writes data on the magnetic side of the tape;
    an assembly which couples movement of the magnetic head to movement of the optical head; and
    an optical servo control system which controls movement of the assembly based on the information relating to the optical servo tracks detected by the optical head, wherein the optical servo control system comprises a coarse head position control system and a fine position servo control loop, the coarse head position control system causing the assembly to move in preset increments and the fine position servo control loop causing the optical head to follow an optical track formed on the tape.

3. The tape drive system of claim 2, further comprising: a stepper motor, controlled by the coarse head position control system, which controls motion of the assembly.

4. A method, for use in a tape drive system comprised of a tape having a magnetic side and an optical side with optical servo tracks formed thereon, an optical head, a magnetic head, an assembly which couples movement of the magnetic head to movement of the optical head, and an optical servo control system, the method comprising:
- detecting information relating to the optical servo tracks using the optical head;
- controlling movement of the assembly, using the optical servo control system, based on the information relating to the optical servo tracks detected by the optical head and using a motor, wherein the optical servo control system comprises a fine position servo loop, the fine position servo loop outputting a signal to control the motor based on the information relating to the optical servo tracks; and
- applying a torque force, using the motor, to a pivoting beam structure coupled between the motor and the assembly, the torque force causing movement of the assembly.

5. A method, for use in a tape drive system comprised of a tape having a magnetic side and an optical side with optical servo tracks formed thereon, an optical head, a magnetic head, an assembly which couples movement of the magnetic head to movement of the optical head, and an optical servo control system, the method comprising:
- detecting information relating to the optical servo tracks using the optical head; and
- controlling movement of the assembly, using the optical servo control system, based on the information relating to the optical servo tracks detected by the optical head, wherein the optical servo control system comprises a coarse head position control system and a fine position servo control loop, the coarse head position control system causing the assembly to move in preset increments and the fine position servo control loop causing the optical head to follow an optical track formed on the tape.

6. The method of claim 5, further comprising: controlling motion of the assembly using a stepper motor that is controlled by the coarse head position control system.

7. The method of claim 6, wherein the assembly comprises first and second arms, the magnetic head being coupled to the first arm and the optical head being coupled to the second arm such that the magnetic head faces in a direction of the optical head; and
further comprising moving the tape through a space between the magnetic head and the optical head such that the magnetic side faces the magnetic head and the optical side faces the optical head.

8. A tape drive system for use with a tape having a magnetic side and an optical side with optical servo tracks formed thereon, the tape drive system comprising: means for detecting information relating to the optical servo tracks; means for reading and writing data on the magnetic side of the tape; and means for coupling movement of the magnetic head to movement of the optical head during reading and writing.

9. The tape drive system of claim 8, wherein the means for coupling comprises a first arm for holding the means for detecting and a second arm for holding the means for reading and writing, the first and second arms being connected physically.

10. The tape drive system of claim 8, wherein the means for coupling comprises a U-shaped member onto which the means for detecting and the means for reading and writing are disposed, and through which the tape moves.

11. The tape drive system of claim 8, further comprising: means for controlling movement of the assembly based on the information relating to the optical servo tracks detected by the means for detecting.

12. The tape drive system of claim 11, wherein the information relating to the optical servo tracks comprises positional information that is used by the means for controlling to move at least one of the means for reading and writing and the means for detecting by controlling movement of the assembly.

13. A system comprising:
- a tape having a magnetic side and an optical side having optical servo tracks;
- a magneto-optic head system having a magnetic head and an optical head, the magneto-optic head system physically coupling the magnetic head to the optical head, wherein the magneto-optic head system comprises a first arm for holding the magnetic head and a second arm for holding the optical head, the first and second arms being connected physically;
- an optical servo control system that aligns the magneto-optic head system to the tape, wherein the optical servo control system comprises a fine position servo loop, the fine position servo loop outputting a signal based on the information relating to the optical servo tracks to control the motor; and
- a pivoting beam structure coupled between the motor and the magneto-optic head system, the motor applying a torque force to the pivoting beam structure that causes movement of the magneto-optic head system.

14. A system comprising:
- a tape having a magnetic side and an optical side having optical servo tracks;
- a magneto-optic head system having a magnetic head and an optical head, the magneto-optic head system physically coupling the magnetic head to the optical head; and
- an optical servo control system that aligns the magneto-optic head system to the tape, wherein the optical servo control system comprises a coarse head position control system and a fine position servo control loop, the coarse head position control system causing the magneto-optic head system to move in preset increments and the fine position servo control loop causing the optical bead to follow an optical servo track formed on the tape.

15. The tape drive system of claim 14, wherein the fine position servo control loop causes the optical head to move to a select optical servo track and to follow the select optical servo track and said system further comprising:
- a stepper motor, controlled by the coarse head position control system, which controls motion of the magneto-optic head system.

* * * * *